United States Patent
Marceau

(10) Patent No.: US 8,574,678 B2
(45) Date of Patent: Nov. 5, 2013

(54) METHOD OF TEXTURING SYNTHETIC MATERIAL EXTRUSIONS

(75) Inventor: Patrick Marceau, St-Nicolas (CA)

(73) Assignee: Dallaire Industries Ltd., Levis, Quebec (CA)

(*) Notice: Subject to any disclaimer, the term of this patent is extended or adjusted under 35 U.S.C. 154(b) by 492 days.

(21) Appl. No.: 12/251,742

(22) Filed: Oct. 15, 2008

(65) Prior Publication Data

US 2009/0098339 A1 Apr. 16, 2009

Related U.S. Application Data

(60) Provisional application No. 60/980,269, filed on Oct. 16, 2007.

(51) Int. Cl.
*B05D 5/00* (2006.01)
(52) U.S. Cl.
USPC ............ 427/299; 427/290; 427/554; 428/151
(58) Field of Classification Search
USPC .................. 427/299, 309, 317; 428/151
See application file for complete search history.

(56) References Cited

U.S. PATENT DOCUMENTS

| | | | | |
|---|---|---|---|---|
| 5,004,383 A | * | 4/1991 | Elliott, Jr. ................. | 408/211 |
| 5,075,059 A | * | 12/1991 | Green ...................... | 264/129 |
| 5,496,630 A | | 3/1996 | Hawrylko et al. | |
| 6,006,816 A | | 12/1999 | Biro et al. | |
| 6,063,475 A | * | 5/2000 | Ciancio et al. ............ | 428/100 |
| 6,287,383 B1 | * | 9/2001 | Biro et al. ................. | 118/307 |
| 6,887,928 B2 | | 5/2005 | Tanzer et al. | |
| 6,930,141 B2 | | 8/2005 | Gebhart et al. | |
| 6,952,903 B2 | * | 10/2005 | West et al. ................ | 52/455 |
| 6,958,185 B1 | * | 10/2005 | Zehner .................... | 428/317.9 |

(Continued)

FOREIGN PATENT DOCUMENTS

| | | |
|---|---|---|
| EP | 0028775 B1 | 5/1981 |
| EP | 1507060 A1 | 2/2005 |

(Continued)

OTHER PUBLICATIONS www.tradekey.com/selloffer_listall/uid/165240/Haichuang-Plastic-Electronic-Co-Ltd.htm, Sep. 13, 2007.

(Continued)

*Primary Examiner* — Timothy H. Meeks
*Assistant Examiner* — Nathan T Leong
(74) *Attorney, Agent, or Firm* — Louis B. Allard; Borden Ladner Gervais LLP

(57) ABSTRACT

A method of texturing a synthetic material, such as polyvinyl chloride (PVC), to resemble a natural material is provided. The method can include texturing a PVC profile after extrusion in order to achieve a surface roughness of about 70 to about 300 micro inches roughness average. The method can include producing a line pattern surface roughness to make the textured PVC resemble a wood finish, particularly when the method includes applying a paint or stain to the textured PVC. The method can include producing a radial pattern surface roughness to make the textured PVC resemble a brushed metal finish. The method of the present invention can be applied to existing PVC elements, such as extruded elements, either at the manufacturing level or at the consumer level. A kit can also be provided including a texturing means, a paint or stain, and instructions.

16 Claims, 3 Drawing Sheets

(56) References Cited

U.S. PATENT DOCUMENTS

| | | | |
|---|---|---|---|
| 7,048,617 B1* | 5/2006 | Spiva | 451/56 |
| 7,097,879 B2 | 8/2006 | Bolten et al. | |
| 2005/0053767 A1* | 3/2005 | Franco et al. | 428/151 |
| 2007/0202305 A1 | 8/2007 | Sun | |

FOREIGN PATENT DOCUMENTS

| | | | |
|---|---|---|---|
| JP | 20044098334 | * | 4/2004 |
| KR | 3090218 A | | 11/2003 |
| KR | 6055861 A | | 5/2006 |
| WO | 2004104314 A2 | | 12/2004 |
| WO | 2006007269 A2 | | 1/2006 |

OTHER PUBLICATIONS http://www.archiexpo.com/tab/imitation-wood.html, Sep. 13, 2007.
http://www.gealan.lt/index.php?id, Sep. 13, 2007.
http://www.paratusindustries.com/Hollow%20Profile%20Embosser.htm, Sep. 13, 2007.
http://www.alibaba.com/showroom/Pvc_Ceiling.html, Sep. 13, 2007.
http://www.backyardamerica.com/decking,htm, Sep. 13, 2007.
http://findarticles.com/p/articles/mi_m0NTC/is_12_16/ai_n8586635, Sep. 13, 2007.

* cited by examiner

METHOD OF TEXTURING SYNTHETIC MATERIAL EXTRUSIONS

CROSS-RELATED APPLICATION

This application claims the benefit of priority of U.S. Provisional Patent Application No. 60/980,269 filed Oct. 16, 2007, which is incorporated herein by reference.

FIELD OF THE INVENTION

The present invention relates generally to the manufacturing and treatment of synthetic material products. Particularly, the present invention relates to modifying the appearance of synthetic material products by texturing an exposed surface of such products.

BACKGROUND OF THE INVENTION

As will be understood by a worker skilled in the art, the word extrusion can refer to the process of squeezing a material through a shaped orifice to produce a linear element with a desired cross section. The word extrusion can also refer to an element or part produced by this process.

The use of synthetic materials such as, for example, polyvinyl chloride (PVC) is well known in the field of residential and industrial constructions. In particular, extrusions of such synthetic materials are often used in the fabrication of doors and windows because they are easy to maintain, relatively inexpensive, light, durable and energy efficient, which has been traditionally used for hundreds of years. However, despite all its advantages, synthetic materials do not offer the traditional finish that wood does.

There have been efforts in the past to enhance the visual appeal of PVC extrusions by attempting to modify them to look like wood. For example, painting PVC extrusions is known and does produce a modified appearance of the extrusions; however, even when painted, they generally do not resemble wood or any other natural material.

In another known approach, cellular PVC is embossed to imitate a wood finish. However, such embossing is performed during the extrusion process per se, before the extrusions are allowed to cool, which means that modifying the appearance of installed extrusions is not an option. Moreover, this embossing method cannot be easily applied to hollow, rigid PVC extrusions, since such hollow profiles generally cannot accept the applied pressure stemming from the embossing process without suffering structural damage.

It is, therefore, desirable to provide a method of texturing PVC, and synthetic material extrusions (SMEs) in general, that can be performed after the manufacturing of the extrusions, i.e., after the extrusion and cooling processes. It is also desirable to provide a method of texturing SMEs that is applicable to hollow SMEs without causing any structural damage thereto.

SUMMARY OF THE INVENTION

It is an object of the present invention to obviate or mitigate at least one disadvantage of previous approaches to making SMEs resemble another material such as, for example, wood.

In a first aspect of the invention, there is provided a method of finishing a synthetic material extrusion (SME). The method comprises steps of texturing the SME to obtain a marked extrusion having a plurality of scores thereon, the marked extrusion having a roughness average of about 70 micro-inches to about 300 micro-inches; and applying a finish to the marked extrusion. The step of texturing the SME can be performed after a cooling phase at the extrusion level, inline with the extrusion process, or off an extrusion line. The step of applying the finish to the marked extrusion can be preceded by a step of polishing the marked extrusion to remove whiskers and burrs from the marked extrusion. The step of applying a finish to the marked extrusion can be followed by steps of polishing the marked extrusion; and re-applying a finish to the marked extrusion.

Further, the plurality of scores can be substantially parallel to each other. The plurality of scores can form a radial pattern, a circular pattern, a cross-hatched pattern, an isotropic pattern or a wood pattern.

The step of texturing can include sanding the SME and the step of sanding can include rubbing sandpaper against the SME. The sandpaper can have a Coated Abrasive Manufacturers Institute (CAMI) grit designation of about 40 to about 180, preferably about 60 to about 100.

The finish can include a paint, a stain, a dye, a varnish, a glaze, a polish, a lacquer, a gloss or a clear. The step of applying a finish to the marked extrusion can include steps of applying a stain to the marked extrusion; and applying a protective coating to the marked extrusion.

The SME can be composed of polyvinyl chloride, acrylonitrile butadiene styrene, Geloy™, acrylic or acrylonitrile styrene acrylate.

The step of texturing can include sanding, sand-blasting, brushing, planning or laser-ablating the SME.

In a second aspect of the invention, there is provided a method of finishing a synthetic material construction element (SMCE). The method comprises steps of texturing the SMCE to obtain a marked element having a plurality of scores thereon, the marked extrusion having a roughness average of about 70 micro-inches to about 300 micro-inches; and applying a finish to the marked element. The SMEC can be an element formed by at least one of compression molding, injection molding and thermoforming. The step of texturing the SMCE can be performed after a cooling phase at the extrusion level, inline with the extrusion process, or off an extrusion line.

In a third aspect of the invention, there is provided a kit for finishing a synthetic material extrusion. The kit comprises a texturing means to form a plurality of scores on the SME, to obtain a marked SME; a finish to apply to the marked SME; and instructions describing the use of the texturing means and of the finish. The instructions can describe the use of the texturing means and of the finish to produce a roughness average in the marked extrusion of about 70 micro-inches to about 300 micro-inches.

In a fourth aspect of the invention, there is provided a synthetic material construction element comprising texturing applied directly to the synthetic material construction element to produce a natural material finish independent of laminating.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
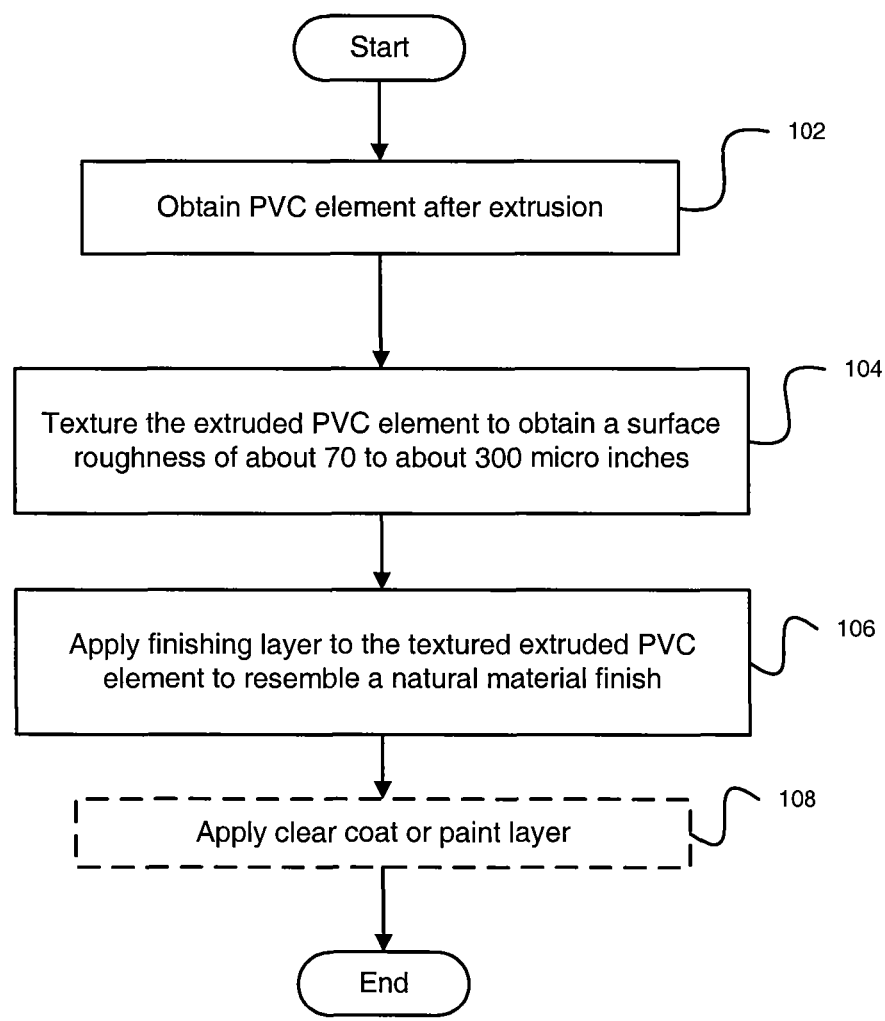
FIG. 1 is a flowchart of a method of texturing a synthetic material extrusion according to an embodiment of the present invention.

Generally, the present invention provides a method of texturing a synthetic material part such as, e.g., a PVC extrusion, to resemble a natural material. The synthetic material part can be formed by any suitable process such as, e.g., extrusion, compression molding, injection molding, thermoforming, etc. The method includes a step of texturing, for example, by abrading the synthetic material part after the formation of the part in question. The step of texturing can occur post-cooling of the synthetic material part. The texturing can be done in order to achieve a surface roughness of about 70 to about 300 micro inches roughness average $R_a$, which is a parameter known in the art of surface textures and is defined as the arithmetic average of the absolute value of the amplitudes in the surface height.

An exemplary method of the present invention can include producing roughness on a surface of the synthetic material part with a line pattern to make the textured synthetic material part resemble a wood finish, particularly when the method includes applying a paint or stain to the textured synthetic material part. The method can include producing any suitable line pattern on the synthetic material part. For example, a radial line pattern can be formed on the synthetic material part to give it the appearance of a brushed metal finish. The method of the present invention can be applied to existing synthetic material parts, such as extruded parts, either at the manufacturing level or at the consumer level. A kit can also be provided including a texturing means, a paint or stain that has the appearance of a natural material, and instructions.

Some known approaches describe embossing PVC extrusions during the extrusion processes, and often before cooling of the extrusion occurs. In contrast, embodiments of the present invention apply a texture to a SME after a cooling phase at the extrusion level, and can be performed inline with the extrusion process or after (or remote from) the extrusion line, perhaps even on installed extrusions. The texturing is described as performed after a cooling phase at the extrusion level, since the cooling of the extrusion continues to some extent after the extrusion process. In this way, finished SMEs can be used as is or can be modified using a texturing method according to an embodiment of the present invention.

Embodiments of the present invention seek to imitate or replicate the look of a natural material by achieving a similar surface roughness to the natural material. For example, according to an embodiment of the present invention, a finish having the appearance of stained wood can be achieved on a PVC extrusion.

The expression "PVC profile" as used herein represents a product having a particular constant cross-section, or characteristic constant axial section, or overall geometry. The PVC profile can be formed by any suitable process. Further, as will be understood by the skilled worker, the invention as described in relation to PVC profiles is also applicable to profiles made of suitable synthetic materials other that PVC or in combination with PVC. Such materials include, for example, acrylonitrile butadiene styrene (ABS), Geloy™, acrylic and acrylonitrile styrene acrylate (ASA). A PVC profile can be of any shape such as U-shaped, T-shaped, L-shaped, etc. or complex combinations of such shapes. The PVC profile can be any extrusion, such as are used for windows, doors, fencing, imitation wood paneling, decking, flooring or any other extruded product. The PVC can be any type of PVC, including rigid PVC, hollow PVC, cellular PVC, foam PVC.

The term "natural material" as used herein represents a natural surface or material, such as, for example, wood or metal. Embodiments of the present invention seek to replicate the look of a natural surface or natural material on a manufactured profile of a synthetic material, for example using a method of texturing and finishing PVC as described below.

In order to imitate or replicate the surface roughness and look of a natural material, such as wood, the following steps are taken according to a generalized exemplary embodiment of the present invention. In a first step, the surface roughness of a wood is evaluated through any suitable method such as, for example, using a surface roughness gauge. In a second step, an abrasive implement, e.g., a sandpaper, is chosen in accordance with the measured surface roughness. This can be done by, e.g., abrading (texturing) different PVC extrusions with different respective sandpapers and by characterizing, e.g., by profilometry, the resulting textured extrusions to determine which one best reproduces the texture of the wood. In a third step, a stain or paint is chosen in accordance with the desired appearance. Finally, a procedure for texturing and staining the synthetic material part is defined.

FIG. 1 is a flowchart of a method of texturing a synthetic material extrusion, such as PVC, according to an embodiment of the present invention. At step 102, a PVC element, or PVC profile, is obtained after extrusion or after any other suitable manufacturing method. This relates to the fact that steps of the present method are taken post-fabrication of the PVC profile. At step 104, the extruded PVC element is textured to produce or obtain a surface roughness of about 70 to about 300 micro inches $R_a$. This desired surface roughness simulates different desirable natural surfaces, or natural surface finishes. In an embodiment, step 104 can include producing a line pattern that yields surface roughness to make the textured PVC resemble a wood finish. The line pattern itself includes a plurality of scores (grooves, channels) formed in the PVC profile and it is this plurality of scores that defines the $R_a$.

In another embodiment, step 104 can include producing a radial pattern surface roughness to make the textured PVC resemble a brushed metal finish. The step of texturing can be performed using any suitable texturing means, e.g., sandpaper, to achieve the desired surface roughness. Optionally, following step 104, there can be a step where the now-textured surface is wiped or gently polished, through any suitable means, such as using sandpaper or a brush, to remove PVC whiskers or burrs that may be protruding from the textured surface and that would otherwise prevent a smooth appearance of the final product.

At step 106, a finishing layer, or finish, is applied to the textured extruded PVC element to resemble a natural material finish, such as, for example, a wood or brushed metal finish. In the case of simulating a wood finish, step 106 can include applying paint or stain to the textured extruded PVC profile. In the case of simulating a brushed metal finish, step 106 can include applying a metallic stain or paint to the textured extruded PVC profile. The finish can include any suitable color elements such as, for example, paint, stain, lacquer and/or dye, and/or a protection element, such as, for example, a varnish, glaze, polish, gloss and/or clear. The color element and the protection element can be chosen in accordance with their bonding characteristics to the material of which the extrusion is made (e.g., PVC), and with the desired look of the finished extruded element. As will be understood by the skilled worker, the color and the protection elements can be further chosen in accordance with whether the textured synthetic material element is to be used indoors or outdoors where temperature variations and ultra-violet flux can contribute to accelerated aging.

Subsequent step 106, there can be repeated steps of lightly polishing the stained textured surface followed by reapplying a finishing layer. Once this has been done, a clear coat or further finish layer can be applied, as indicated at optional step 108. Subsequent step 106, the clear coat can be polished and another layer of clear coat or finish can be applied. Any combination of finish and clear coat layers can be used to achieve a desired thickness.

The steps of applying a finishing layer and a clear coat to the textured PVC element can be done in any suitable way such as by, for example, brushing, spraying, applying with a sponge, cloth, rag etc.

Figures 2A, 2B:
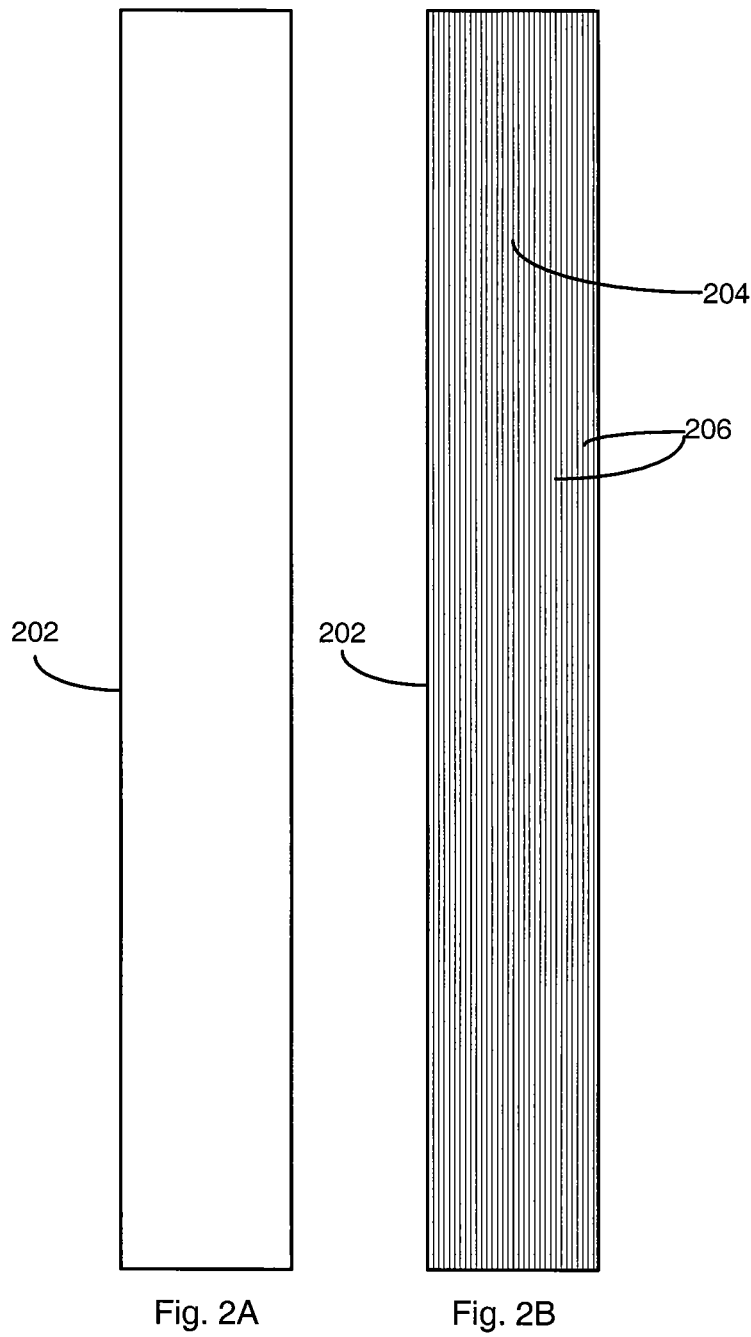
FIG. 2A shows front view of a PVC extrusion prior to being textured.
FIG. 2B shows the PVC extrusion of FIG. 2A after it has been textured.

FIG. 2A shows a front view of an extruded PVC member 202 prior to being subjected to the method illustrated at FIG. 1. FIG. 2B shows the PVC member 202 after having been textured in accordance with the method of FIG. 1. A vertical line pattern 204 is shown as parallel lines 206 extending along the length of the PVC member.

The line pattern 204 can be formed in any suitable way. For example, the extruded PVC member 202 can be scratched with any suitable grit sandpaper such as sandpaper having a Coated Abrasive Manufacturers Institute (CAMI) grit designation of about 40 to about 180, preferably about 60 to about 100. Any other suitable grit designation can also be used. Any other method of scratching the PVC member can be used. For example, amongst others, sanding, sand-blasting, brushing, planning and laser ablation can be used.

Figure 3A:
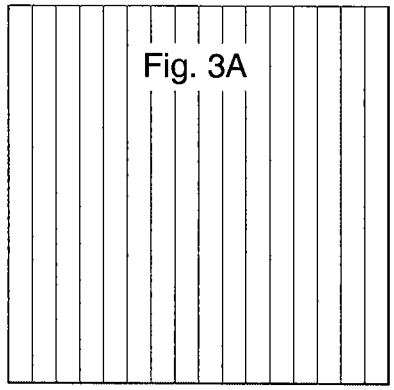
FIGS. 3A-3F shows exemplary line patterns that can be applied to synthetic material extrusions.
Figure 3B:
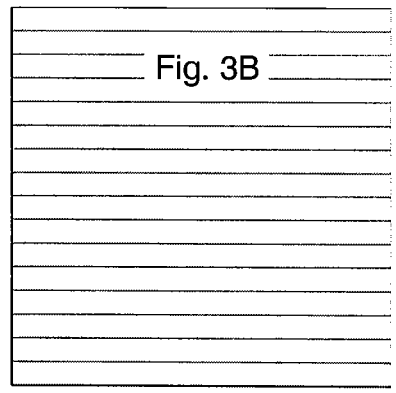
Figure 3C:
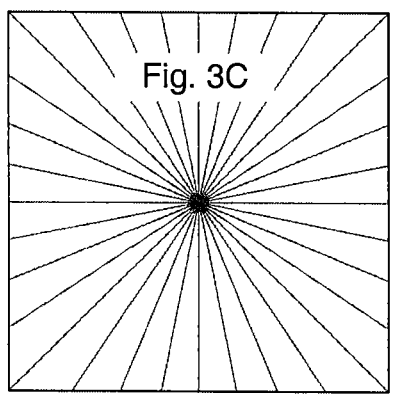
Figure 3D:
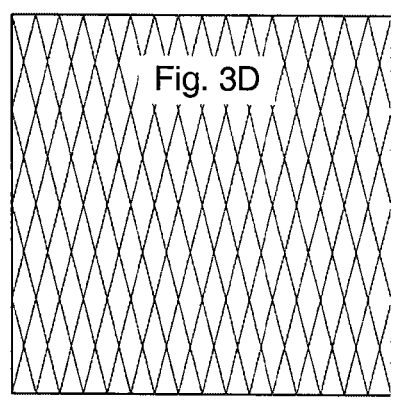
Figure 3E:
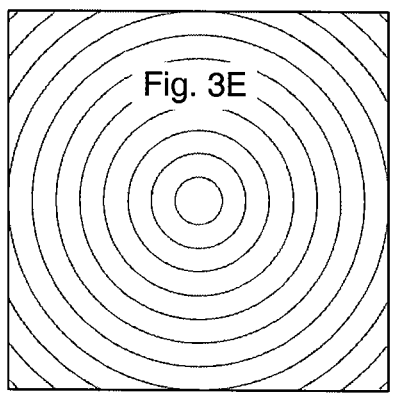
Figure 3F:
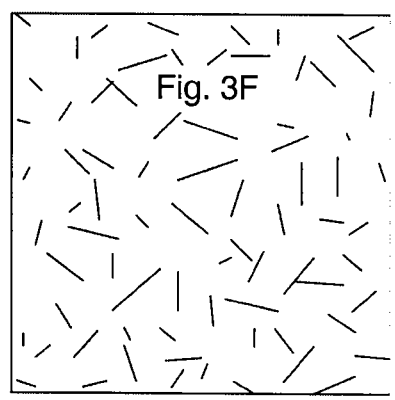

FIGS. 3A-3F show different exemplary line patterns that can be applied to extruded synthetic members. FIG. 3A shown a vertical line pattern, FIG. 3B shows a horizontal line pattern, FIG. 3C shows a radial line pattern, FIG. 3D shows a cross-hatched line pattern, FIG. 3E shows a circular line pattern and FIG. 3F shows an isotropic line pattern. Of course, other line patterns, e.g., a slanted parallel line pattern, are within the scope of the invention. As will be understood by the skilled worker, a given extruded synthetic member can have one or more line patterns formed thereon. As will also be understood by the skilled worker, different line patterns can be formed on different sections of the given extruded synthetic member or, can overlap. FIGS. 3A-3F are modified figures obtained from Wikipedia Commons.

One of the advantages of post-extrusion texturing and staining of PVC is the ability to use standard PVC profiles to create a modified PVC profile that resembles a wood or metal finish. For example, a supplier can order a number of standard PVC profiles and sell some of them unmodified, and modify others according to an embodiment of the present invention. Not only is this convenient for the supplier, it is also convenient for the manufacturer, since a single production line can be used to produce PVC that can be used in a standard way, or further processed according to embodiments of the present invention.

Moreover, there is an additional benefit of being able to perform methods according to embodiments of the present invention on PVC windows and doors, or other extruded synthetic compound products, that are already in the possession of the consumer, whether they are installed or not. Greater care may be required to perform the steps of texturing and applying a finish.

Advantageously, according to an embodiment of the present invention there is provided a kit for modifying an extruded PVC profile. This kit can be used as a do-it-yourself package and sold in retail outlets. The kit can include a texturing means, such as a piece of sandpaper, to texture the extruded PVC profile to produce a surface roughness of about 70 to about 300 micro inches $R_a$. The kit can also include a finishing stain to apply to the textured extruded PVC profile. The stain can be an industrial stain specially formulated for PVC or for other synthetic materials or a metallic stain or paint. The stain can be a specially formulated stain that has been optimized for use on PVC, which has appropriate absorbency and weather resistance characteristics once applied, so that the advantageous features of PVC can be maintained. The kit can also include an instruction sheet including directions on how to properly texture and apply the finish according to embodiments of the present invention, as described above.

According to another embodiment of the present invention, a textured PVC profile is provided. The textured PVC profile can be textured according to one of the methods as described earlier, and can be sold to a manufacturer, distributor or consumer ready for staining. This provides flexibility in providing a product that can be tailored to suit the needs of the end consumer. The kit described above can be modified to include a textured PVC profile, or to be sold along with it.

According to a further embodiment of the present invention, a finished textured extruded PVC profile is provided. The finished textured PVC profile can be textured and finished according to one of the methods described above, to resemble a wood or brushed metal finish, or another natural material finish. It can be sold in varying lengths, or as finished window or door parts, fencing parts, simulated wood panels, flooring, etc. in various natural material finishes.

In summary, embodiments of the present invention seek to modify an extruded profile of a synthetic material to replicate the appearance and/or surface roughness of a natural material. This can include texturing the extruded synthetic material profile to produce a surface roughness of about 70 to about 300 micro inches $R_a$. This can also include applying a finish to the textured extruded synthetic material profile to produce a modified extruded textured synthetic material profile that resembles a natural material finish in surface roughness and/or appearance.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of finishing a synthetic material extrusion (SME), the method comprising steps of:

texturing the SME to obtain a marked SME having a plurality of scores thereon, the marked SME having a roughness average (Ra) of about 70 micro-inches to about 300 micro-inches, the texturing including sanding the SME or brushing the SME;

polishing the marked SME to remove at least one of whiskers and burrs from the marked extrusion, the at least one of whiskers and burrs having been formed by sanding the SME or brushing the SME;

staining the marked SME to obtain a stained marked SME having a stained wood finish; and applying a protective coating to the stained marked SME.

2. The method of claim 1 wherein:
the SME is obtained by an extrusion process; and
texturing the SME is performed after the extrusion process, subsequent a cooling phase of the SME.

3. The method of claim 2 wherein the extrusion process is performed on an extrusion line and texturing the SME is performed with the SME on the extrusion line.

4. The method of claim 2 wherein the extrusion process is performed on an extrusion line and texturing the SME is performed with the SME off the extrusion line.

5. The method of claim 1 wherein a portion of the plurality of scores are substantially parallel to each other.

6. The method of claim 1 wherein the plurality of scores form a radial pattern, a circular pattern, a cross-hatched pattern, an isotropic pattern, or a wood pattern.

7. The method of claim 1 wherein sanding the SME includes rubbing sandpaper against the SME.

8. The method of claim 7 wherein the sandpaper has a Coated Abrasive Manufacturers Institute (CAMI) grit designation of about 40 to about 180.

9. The method of claim 1 wherein the SME is composed of polyvinyl chloride, cellular polyvinyl chloride, acrylonitrile butadiene styrene, Geloy™, acrylic or acrylonitrile styrene acrylate.

10. The method of claim 1 wherein the SME is a hollow SME.

11. The method of claim 1 wherein the SME includes at least one of a U-shaped profile, a T-shaped profile, or an L-shaped profile.

12. A method of finishing a synthetic material construction element (SMCE), the method comprising steps of:
texturing the SMCE to obtain a marked SMCE having a plurality of scores thereon, the marked SMCE having a roughness average (Ra) of about 70 micro-inches to about 300 micro-inches, the texturing including sanding the SMCE or brushing the SMCE;
polishing the marked SMCE to remove at least one of whiskers and burrs from the marked SMCE, the at least one of whiskers and burrs having been formed by sanding the SME or brushing the SME;
staining the marked SMCE to obtain a stained marked SMCE having a stained wood finish; and
applying a protective coating to the stained marked SMCE.

13. The method of claim 12 wherein:
the SMCE is obtained by an extrusion process; and
texturing the SMCE is performed after the extrusion process, subsequent a cooling phase of the SMCE.

14. The method of claim 12 wherein the extrusion process is performed on an extrusion line and texturing the SMCE is performed with the SMCE on the extrusion line.

15. The method of claim 13 wherein the extrusion process is performed on an extrusion line and texturing the SMCE is performed with the SMCE off the extrusion line.

16. The method of claim 12 wherein the SMCE is an element formed by compression molding, injection molding or thermoforming.

* * * * *